United States Patent [19]
Linzer et al.

[11] Patent Number: 6,038,256
[45] Date of Patent: Mar. 14, 2000

[54] STATISTICAL MULTIPLEXED VIDEO ENCODING USING PRE-ENCODING A PRIORI STATISTICS AND A PRIORI AND A POSTERIORI STATISTICS

[75] Inventors: Elliot N. Linzer, Bronx; Aaron Wells, New Rochelle, both of N.Y.

[73] Assignee: C-Cube Microsystems Inc., Milpitas, Calif.

[21] Appl. No.: 08/775,313

[22] Filed: Dec. 31, 1996

[51] Int. Cl.[7] ..................................... H04N 7/08
[52] U.S. Cl. ................. 375/240; 348/385; 348/387; 370/538
[58] Field of Search ................... 348/385–389, 348/405, 419, 397–398, 415, 409–412, 400–401; 382/232, 236, 239; 370/538, 468; 455/6.3

[56] References Cited

U.S. PATENT DOCUMENTS

| | | | |
|---|---|---|---|
| 4,394,774 | 7/1983 | Widergren et al. | 348/415 |
| 5,115,309 | 5/1992 | Hang | 348/387 |
| 5,216,503 | 6/1993 | Paik et al. | 348/385 |
| 5,289,462 | 2/1994 | Ahmadi et al. | 370/232 |
| 5,534,926 | 7/1996 | Ohki et al. | 348/385 |
| 5,537,440 | 7/1996 | Eyuboglu et al. | 348/405 |
| 5,541,852 | 7/1996 | Eyuboglu et al. | 364/514 |
| 5,550,589 | 8/1996 | Shiojiri et al. | 348/387 |
| 5,550,590 | 8/1996 | Sakazawa et al. | 348/387 |
| 5,617,142 | 4/1997 | Hamilton | 348/405 |
| 5,708,664 | 1/1998 | Budge et al. | 348/385 |
| 5,717,464 | 2/1998 | Perkins et al. | 348/419 |
| 5,754,700 | 5/1998 | Kuzma | 382/236 |
| 5,805,220 | 9/1998 | Keesman et al. | 348/385 |
| 5,861,919 | 1/1999 | Perkins et al. | 348/385 |

OTHER PUBLICATIONS

Jabbari et al, "Statistical Characterization and Block–Based Modeling of Motion–Adaptive Coded Video", IEEE Trans. on Cir. and Syst. for Video Technology, vol. 3, No. 3, pp. 199–207, Jun. 1993.

Reininger et al, "Statistical Multiplexing of VBR MPEG Compressed Video on ATM Networks", IEEE, pp. 919–926, 1993.

M. Perkins & D. Arnstein, *Statistical Multiplexing of Multiple MPEG–2 Video Programs in a Single Channel*, SMPTE J., vol. 104, No. 9, p. 596–599, Sep., 1995.

L. Wang & A. Vincent, *Joint Rate Control for Multi–Program Video Coding*, IEEE Trans. on Cons. Elecs., vol. 42, No. 3, Aug., 1996.

*Primary Examiner*—Vu Le
*Attorney, Agent, or Firm*—Proskauer Rose LLP

[57] ABSTRACT

A statistical multiplexing apparatus and method for generating and combining a plurality of encoded video bit streams. A storage device contains pre-stored a priori statistics indicative of the encoding complexity of the video signals from which the encoded video bit streams will be generated. The pre-stored a priori statistics may include inter-pixel differences in the same picture or between multiple pictures or pre-encoding a priori statistics generated during a preliminary encoding of the video signals. Examples of pre-encoding a priori statistics include the number of bits per picture at a given quantization level, an average quantization level, picture types, scene change locations and repeat field for one or more of the video bit streams. The video signals are applied to encoders which compress the signals in accordance with bit allocation decisions generated by a statistics computer. The statistics computer uses only pre-encoding a priori statistics from the storage device to generate bit allocation decisions. Alternatively, the statistics computer may use any type of a priori statistics in conjunction with a posteriori statistics received from the encoders in allocating bits. The resulting compressed video bit streams are applied to a multiplexer and combined into a single multiplexed bit stream for transmission on a single channel. The statistics computer thus has access to additional information regarding the encoding complexity of the video bit streams to be encoded and combined, and can therefore generate more accurate bit allocations and better maintain consistent video quality across multiple encoded bit streams.

42 Claims, 5 Drawing Sheets

STATISTICAL MULTIPLEXED VIDEO ENCODING USING PRE-ENCODING A PRIORI STATISTICS AND A PRIORI AND A POSTERIORI STATISTICS

FIELD OF THE INVENTION

The present invention relates generally to digital video encoding and more particularly to video encoding in which statistical multiplexing is used to combine several encoded video bit streams into a single multiplexed bit stream, e.g., for transmission on a single channel.

BACKGROUND OF THE INVENTION

Many video encoding applications utilize statistical multiplexing techniques to combine several compressed video bit streams into a single multiplexed bit stream, e.g., for transmission on a single channel. The bit rate of a given compressed stream generally varies with time based on the complexity of the corresponding video signals. A statistical multiplexer attempts to estimate the complexity of the various video frame sequences of a video signal and allocates channel bits among the corresponding compressed video bit streams so as to provide an approximately constant level of video quality across all of the multiplexed streams. For example, a given video frame sequence with a relatively large amount of spatial activity or motion may be more complex than other sequences and therefore allocated more bits than the other sequences.

An example of a statistical multiplexing encoding system is described in M. Perkins & D. Arnstein, *Statistical Multiplexing of Multiple MPEG-2 Video Programs in a Single Channel*, SMPTE J., vol. 104, no. 9, p. 596–599, September, 1995. As described in this reference, multiple encoders each receive a respective program, encode the program, and place their compressed picture data of a video signal of the program in a corresponding buffer of fixed size pending submission to a multiplexer. (As per MPEG-2 parlance, a "program" is a collection of one or more related signals. Herein, a program is presumed to include a video signal but may also include one or more associated audio signals, a close caption text signal, etc.) A multiplexer receives the encoded programs from the multiple encoders, in the form of a bit stream. A different bit rate may be assigned to each bit stream depending on a respective estimate of the number of bits needed by the video bit stream of the corresponding program to achieve the same level of quality as the other programs with which it is multiplexed. (Generally speaking, the bit rate of the video bit stream of a program is variable whereas the bit rates of the audio and other associated bit streams of a program are constant. This invention is illustrated in the context of adjusting only the bit rate of the video bit stream portion of a program.) On the receiving end of the communication, a decoder receives the multiplexed multiple program bit stream and discards the data it does not need (e.g., if the decoder is a set top box, only the "tuned" or selected program is retained, whereas the data of each non-selected program is discarded). The retained data is inputted to the decoder's input buffer of a fixed size pending decoding. The removal of data from the decoder buffer for decoding is controlled in a strict fashion to effect a constant end-to-end delay for any selected program. In the statistical multiplexing encoding scheme, the relative timing of each to-be-multiplexed program is independent. A first encoder for a first program may have many pictures of compressed data in its buffer pending submission to the multiplexer while a second encoder for a second bit stream may have only a few pictures in its buffer pending submission to the multiplexer. A decoder that selects the first program for decoding will be receiving "earlier" pictures than a decoder that selects the second program for decoding. Such a variable delay is eliminated by each decoder lengthening or shortening the amount of time the received pictures spend in the decoder buffer pending decoding to effect the above-noted constant end-to-end delay.

FIG. 1 shows a conventional statistical multiplexer 10. The statistical multiplexer 10 includes a number n of video sources 12-i, i=1, 2, ... n. Each of the n video sources 12-i supplies a video signal (e.g., a video bit stream) to a corresponding encoder 14-i. The encoders 14-i generate compressed video bit streams which are supplied to a multiplexer 16. The multiplexer 16 combines all of the compressed video bit streams into a single multiplexed bit stream. Each of the encoders 14-i sends statistics about the video bit stream that it is encoding to a statistics computer 18. The statistics computer 18 uses the statistics received from the encoders 14-i to determine a suitable allocation of available channel bits among the n video bit streams. The statistics computer 18 sends information regarding the allocated bit rate of each video bit stream to the corresponding encoders 14-i.

A significant problem with the conventional statistical multiplexer 10 is that bit allocation decisions are generally made using only a posteriori statistics. The statistics computer 18 therefore only receives information about pictures of the n video bit streams that have already been encoded, and must use this information to allocate bits among those pictures that have yet to be encoded. This reliance on a posteriori statistics can result in periods of poor video quality when the video bit streams are eventually demultiplexed, decoded and displayed. The degradation in video quality is particularly severe if one or more of the n to-be-encoded video signals includes a relatively large number of transitions between very complex pictures and very simple pictures. Such transitions can lead the statistics computer 18 to allocate an excessive number of bits to simple pictures of a given video bit stream, or to allocate an insufficient number of bits to complex pictures of the video bit stream, resulting in substantial degradation in perceived video quality for one or more of the multiplexed video bit streams.

The Perkins and Arnstein reference suggests an alternative to the a posteriori statistical multiplexing scheme which uses a priori statistics. An a priori statistical multiplexer is shown in FIG. 2. In the system 40, each of n video sources 42-i for i=1, 2, ..., n outputs a to-be-encoded program to a corresponding statistics gatherer circuit or processor 43-i for i=1, 2, ..., n, respectively. The statistics gatherers 43-i measure various statistics on the video signal of the program in order to determine the level of difficulty, at that particular instant, in compressing the uncompressed program. A statistics computer 48 receives the statistics gathered by each statistics gatherer 43-i, and allocates a bit rate to each encoder 44-i for i=1, 2, ..., n based on the gathered statistics. A multiplexer 46 multiplexes, i.e., combines, the compressed program bit stream to form a single multiplexed bit stream for transmission on a single channel.

As noted by the Perkins and Arnstein reference, it is difficult to find statistic metrics which lead to an appropriate allocation of bit rates. For instance, if the statistic metric employed by a statistics gatherer significantly underestimates the needs of the program for which it gathers statistics, then the video bit stream of that particular program will be encoded at a significantly lower quality level relative to the other programs. This disparity in quality level will only be corrected when the nature of the video bit stream of that program changes such that the statistics gathered for that program more accurately reflect its encoding needs.

L. Wang & A. Vincent, *Joint Rate Control for Multi-Program Video Coding*, IEEE TRANS. ON CONS. ELECS., vol. 42, no. 3, August, 1996, proposes an alternative to statistical multiplexing. According to the Wang and Vincent reference, multiple programs are encoded as a single program. A super frame is defined including one frame from the video signal of each to-be-multiplexed program. A bit target is set for each super frame and the bit target may be nearly met by determining a quantization level for the super frame that will generate approximately the correct number of bits for each constituent frame in the super frame. The quantization level is identified by encoding each constituent frame of the super frame several times at different quantization levels, determining the number of bits generated for each encoded frame, and then searching over the encoded frames thus produced using a binary search algorithm. Note that in this encoding technique, each program is synchronized and the timing is controlled for all programs as if a single encoder produced all of the compressed bit streams. This means that the relative frame transmission rates of each program (in compressed form) do not vary relative to each other. This simplifies the rate control and is an appropriate technique to use when the receiver must decode each of the programs multiplexed together.

Note that the decoder disclosed in this reference is intended to receive and decode each program and must therefore have a large enough buffer to accommodate the frames of each program. However, even if the decoder selects only a single program for decoding and discards data for the other programs, the decoder buffer must still be increased in size relative to a decoder buffer that receives a statistically multiplexed signal. Consider that the synchronization requirement on the encoders causes each super frame to include a frame of each of the programs. However, the size of each frame varies depending on the frame type, its complexity, etc. Suppose a decoder selects a $q^{th}$ program for decoding. The $j^{th}$ frame for program q might be separated from the $(j+1)^{th}$ frame by several large frames for other programs 1,2, . . . q−1. Therefore, the decoder buffer must be increased to store more frames (e.g., j−2, j−1, j) to ensure that the decoder does not underflow while waiting for the $(j+1)^{th}$ frame. Such a problem does not exist in a statistical multiplexer since there is no requirement to multiplex one frame from each of the other programs between frames j and j+1, especially when such frames are very large. Any increase in decoder buffer size requirements presents a particularly large expense for a video distribution network such as a direct broadcast satellite network or a cable television network wherein a single multiplexer may transmit a multiplexed signal to thousands or even millions of set top box receiver/decoders. As such, the statistical multiplexing technique, wherein the multiplexer allocates bit rates but wherein each program has independent timing, is preferred.

As is apparent from the above, there is a need for improved statistical multiplexing which is better able to maintain quality across multiple video bit streams.

SUMMARY OF THE INVENTION

The present invention provides a statistical multiplexing apparatus and method for generating and combining a plurality of encoded video bit streams. The statistical multiplexing of the present invention utilizes pre-stored a priori statistics, indicative of the encoding complexity of a video bit stream of an inputted program, which statistics are gathered while encoding the video bit stream a first time. The video bit stream is then re-encoded, i.e., encoded a second time, at an appropriate rate for transmission. The pre-stored a priori statistics gathered during the first encoding may include a number of bits generated for each compressed picture, an average quantization level, picture types, scene change locations and repeat field patterns. These statistics are very accurate predictions of how difficult the video bit stream will be to encode during the final encoding and therefore the quality across all of the compressed programs will be close to constant.

The present invention also provides a statistical multiplexing apparatus and method for generating and combining a plurality of compressed video bit streams using pre-stored a priori statistics gathered on the inputted video signals and a posteriori statistics gathered during the actual (final) encoding of the video bit streams. The a priori statistic metric may include inter-pixel differences within a picture or between pictures, statistics gathered from a preliminary encoding step (if performed) such as the number of bits generated for each compressed picture, repeat field pattern, average quantization level, scene change locations and picture types.

A statistics computer in the statistical multiplexer uses the pre-stored a priori statistics in conjunction with conventional a posteriori statistics generated during actual encoding to determine an appropriate bit allocation for the to-be-multiplexed bit streams. A statistical multiplexer in accordance with the present invention thus has access to additional information regarding the encoding complexity of the to-be-encoded and to-be-multiplexed video signals, and can therefore generate more accurate bit allocations and better maintain consistent video quality across multiple compressed video bit streams.

An exemplary embodiment of the invention includes a video source which generates a plurality of video signals (e.g., a plurality of program signals which each contains a video signal). The video signals are applied to a statistics gatherer which generates the above-noted pre-stored a priori statistics and stores the statistics in a first storage device. The actual video signals are stored in a second storage device. Encoders retrieve the video signals from the second storage device and encode the video signals in accordance with a bit allocation determined by a statistics computer. The statistics computer determines the bit allocation based on pre-stored a priori statistics retrieved from the first storage device in conjunction with conventional a posteriori statistics supplied from the encoders. The resulting encoded video bit streams are supplied to a multiplexer which combines the video bit streams into a single multiplexed bit stream (e.g., for output or transmission on a single channel).

In a variation on this embodiment, the video signals are pre-encoded and stored as compressed video bit streams in the storage device. The compressed video bit streams are subsequently retrieved, decoded and re-encoded by transcoders according to a bit allocation determined using both the a priori and a posteriori statistics. The transcoders generate the a posteriori statistics during the re-encoding of the video signals.

Another exemplary embodiment may include a first set of encoders which retrieve and encode stored video signals using a bit allocation determined using both pre-stored a priori statistics and conventional a posteriori statistics, and a second set of encoders which each receive a video signal directly from a video source and encode the video signals using a bit allocation determined using only conventional a posteriori statistics. Such an embodiment is particularly useful in applications in which both stored and live video signals are multiplexed. For example, this exemplary statistical multiplexer may be used in a broadcasting head-end which broadcasts previously-stored programs such as pay-per-view movies as well as live programs such as sporting or news events. (Herein the term "event" means a program with a definite start time and stop time as per MPEG parlance.)

Another exemplary embodiment of the invention includes an encoder and statistics gatherer, both of which process a number of video signals. The encoder generates corresponding encoded bit streams. The statistics gatherer generates corresponding pre-encoding a priori statistics for the video bit streams during the encoding and stores the pre-encoding a priori statistics in the storage device. The video bit streams are subsequently applied to inputs of corresponding encoders, while the sets of pre-encoding a priori statistics are retrieved from the storage device and applied to a statistics computer. The statistics computer utilizes the pre-encoding a priori statistics to allocate available channel bits between the to-be-multiplexed video bit streams. The encoders re-encode the video bit streams using the bit allocation determined by the statistics computer. The re-encoded video bit streams are then applied to a multiplexer which combines the video bit streams into a single multiplexed bit stream. This exemplary statistical multiplexer generates improved bit allocation decisions in part by utilizing pre-encoding a priori statistics generated from a previous encoding of the to-be-multiplexed video bit streams.

These and other features and advantages of the present invention will become more apparent from the accompanying drawings and the following detailed description.

DETAILED DESCRIPTION OF THE INVENTION

The present invention will be illustrated below using a number of exemplary statistical multiplexers suitable for use in video encoding applications. It should be understood, however, that the invention is more broadly applicable to any application which involves bandwidth allocation between multiple encoded bit streams. Furthermore, although particularly well-suited for use in MPEG-2 applications, the invention may be utilized with encoded bit streams generated using other encoding techniques. The term "pre-stored statistics" should be understood to include any type of information indicative of the encoding complexity of a given signal which is generated before a bit allocation decision is made for that program. This information may be stored in a storage device as in the illustrative embodiments, in an internal random-access memory of a statistics computer, or elsewhere as required in a particular application.

Figure 3:
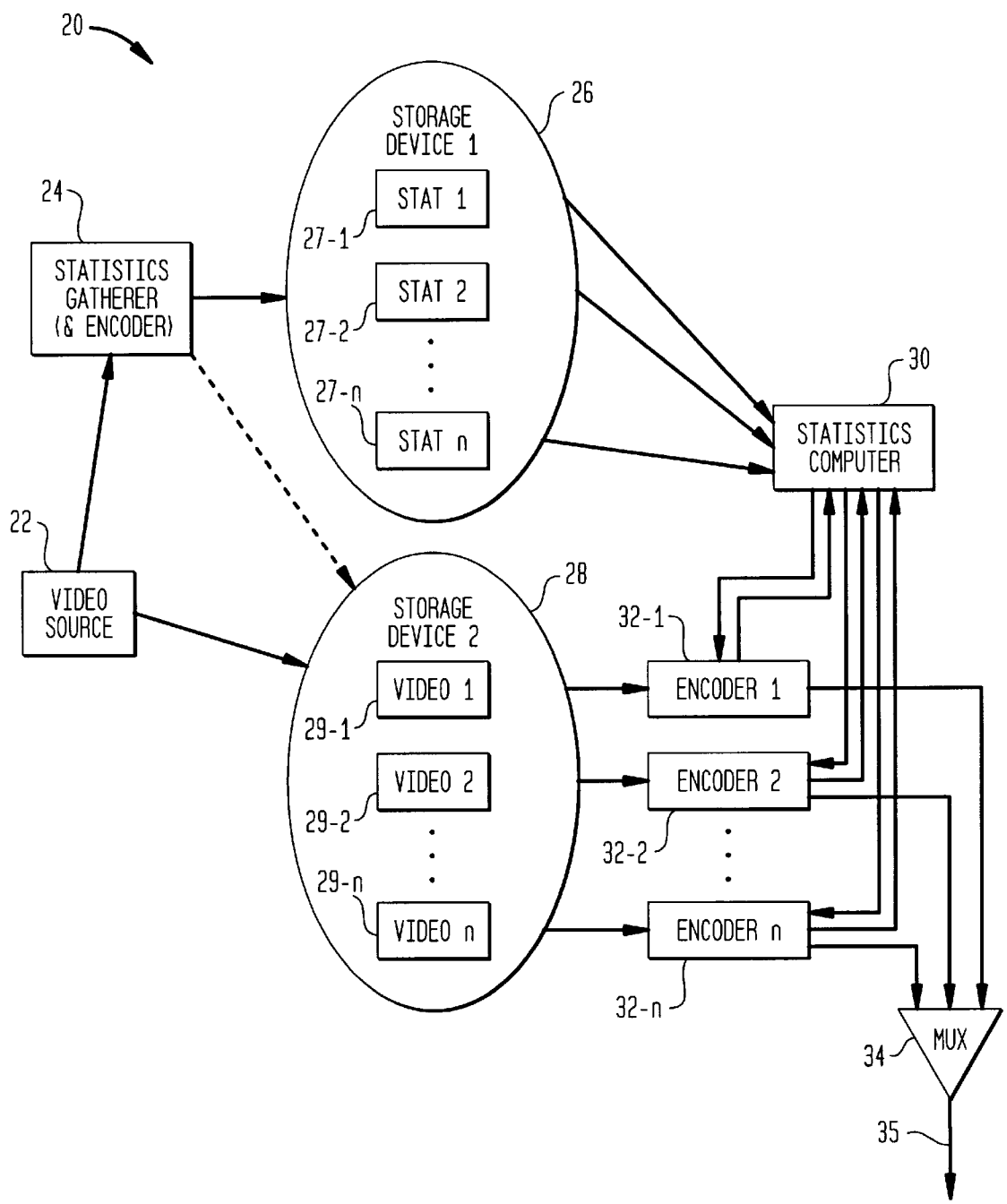
FIGS. 3 and 4 show first and second exemplary embodiments of a statistical multiplexer utilizing a priori and a posteriori statistics in accordance with the present invention.

FIG. 3 shows an exemplary statistical multiplexer 20 in accordance with a first exemplary embodiment of the present invention. The statistical multiplexer 20 includes a video source 22 which generates a number n of video signals. The n video signals are applied to a statistics gatherer 24 which gathers a priori statistics regarding the n video signals. The statistics gatherer 24 stores a set of a priori statistics 27-i, i=1, 2 . . . n for each of the n video signals on a first storage device 26. The video source 22 also supplies the video signals to a second storage device 28. The second storage device thus includes n stored video signals 29-i. The first and second storage devices 26, 28 may be optical or magnetic hard drives, disk arrays or electronic memory. The first and second storage devices 26 and 28 can also be combined into a single storage device.

Optionally, the statistics gatherer 24 may include an encoder for encoding each received video signal. Encoding may be performed according to, for example, the MPEG-2 standard as disclosed in ISO/IEC IS 13818-1,2,3. The contents of these standards documents are incorporated herein by reference. In such a case, the a priori statistics may be generated during this pre-encoding of the video signals. Furthermore, the statistics gatherer 24 may output the compressed video bit streams produced by the encoding for storage in the second storage device 28 instead of the uncompressed video signals outputted from the video source 22. Preferably, however, the uncompressed video signals are stored in the second storage device 28 and certain encoding results, e.g., motion estimation results, such as optimal motion vectors, inter/intra decisions, coded/non-coded macroblock decisions, etc., are stored in the second storage device 28 along with the uncompressed video signals.

Although the statistical multiplexer 20 is shown in a form suitable for non-real-time encoded video signals, it can easily be adapted for real-time encoding. For instance, one video source 22 and a corresponding statistics gatherer can be provided for each video signal to be encoded in parallel. The second storage device 28 in this embodiment need not store the entire video signal of the event of the corresponding program. Rather, as described in greater detail below, only temporary storage for a limited number of frames need be provided.

A statistics computer 30 retrieves the pre-stored a priori statistics 27-i from the first storage device 26. The corresponding stored video signals 29-i are retrieved from the second storage device 28 and applied to respective encoders 32-i. The encoders 32-i may be configured to operate in accordance with the MPEG-2 standard. Each encoder 32-i produces a compressed video bit stream. Alternatively, the encoders 32-i are transcoders which include decoders. The decoders are for first decoding the retrieved video signals 29-i, in the event the retrieved video signals 29-i are already compressed. The transcoders 32-i then re-encode the video signals 29-i. Preferably, the retrieved video signals 29-i are uncompressed but include encoding information previously determined during pre-encoding by the statistics gatherer 24. The encoders 32-i encode the video signals using such retrieved encoding information.

The statistic computer 30 also receives additional information in the form of a posteriori statistics from the encoders 32-i regarding the video signals being encoded. The statistics computer 30 utilizes the pre-stored a priori statistics 27-i and the additional a posteriori information from the encoders 32-i to allocate the available channel bits among the n video signals to be encoded. The resulting compressed bit streams are supplied from the encoders 32-i to inputs of a multiplexer 34. The multiplexer 34 combines the multiple compressed bit streams into a single multiplexed bit stream outputted on channel output 35. The statistics computer 30 may be implemented as an application-specific integrated circuit (ASIC), microprocessor or other digital data processor programmed to provide the described processing functions. Some or all of the functions of statistics computer 30 may be provided by an integrated processing device which also provides certain functions of the statistics gatherer 24 as well as one or more of the encoders 32-i.

Figure 1:
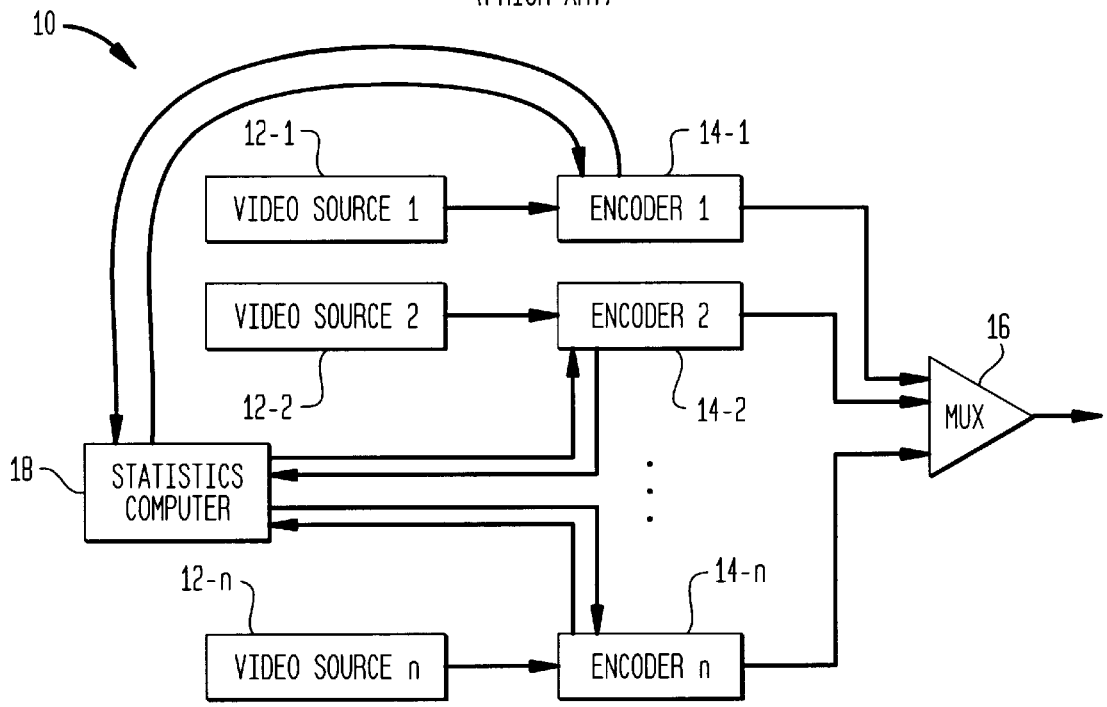
FIG. 1 shows a first conventional statistical multiplexer.
Figure 2:
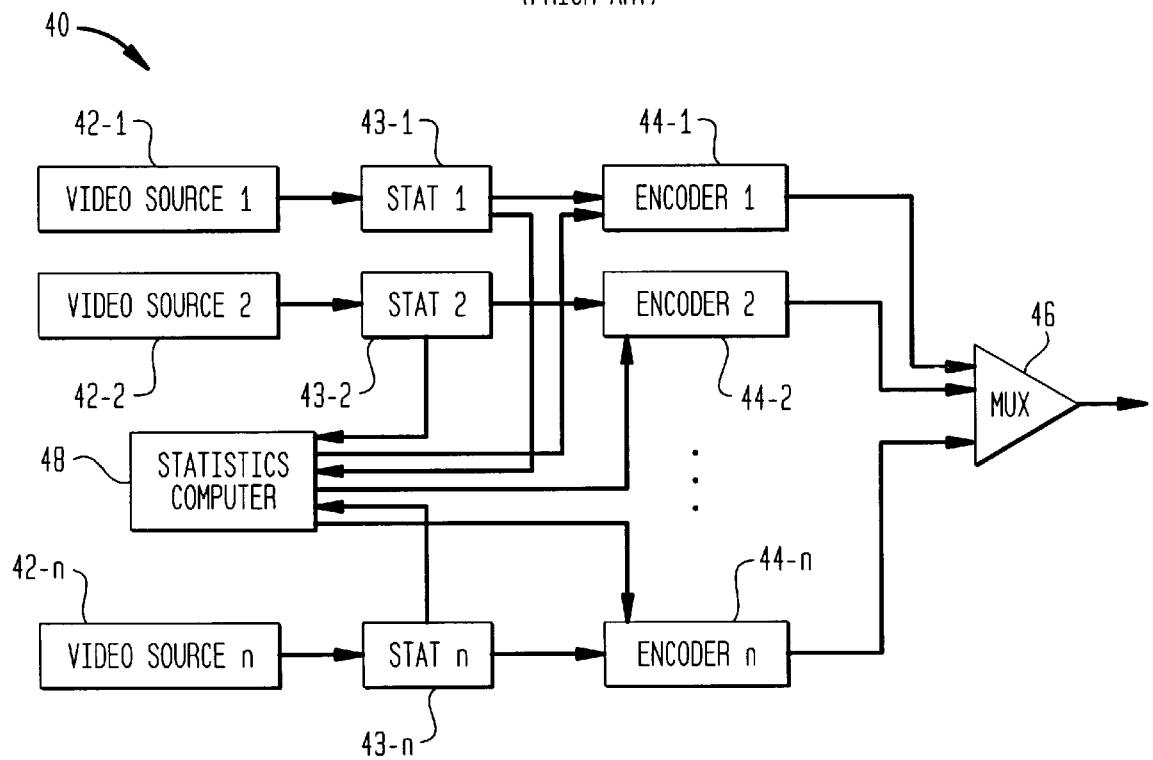
FIG. 2 shows a second conventional statistical multiplexer.

The statistics computer 30 in the statistical multiplexer 20 utilizes pre-stored a priori information about the video bit stream that each encoder 32-i is about to encode before allocating bits among the encoders. The statistical multiplexer 30 also operates in a manner similar to the conventional statistical multiplexer 10 of FIG. 1 insofar as it utilizes information supplied from the encoders as the video signals are being encoded. This use of both pre-stored a priori and a posteriori statistics is particularly useful in situations in which a portion of a video bit stream that the statistics computer 30 determined would be simple to encode turns out to be much more difficult to encode at a specific allocated bit rate. The statistics computer 30 of FIG. 3 has more information available to it than a conventional statistics computer, and can therefore make more accurate bit allocation decisions and better maintain video quality across multiple encoded bit streams.

As per the statistical multiplexing paradigm, the video signals outputted form the video source 22 have mutually independent timing. The encoders 32-i independently encode the received video signals 29-i in an asynchronous fashion—the picture rates of the encoders 32-i are not synchronized. Likewise, in multiplexing the compressed video bit streams, the instantaneous picture rates of each compressed video signal in the multiplexed bit stream are independent and fluctuate with respect to each other.

Figure 4:
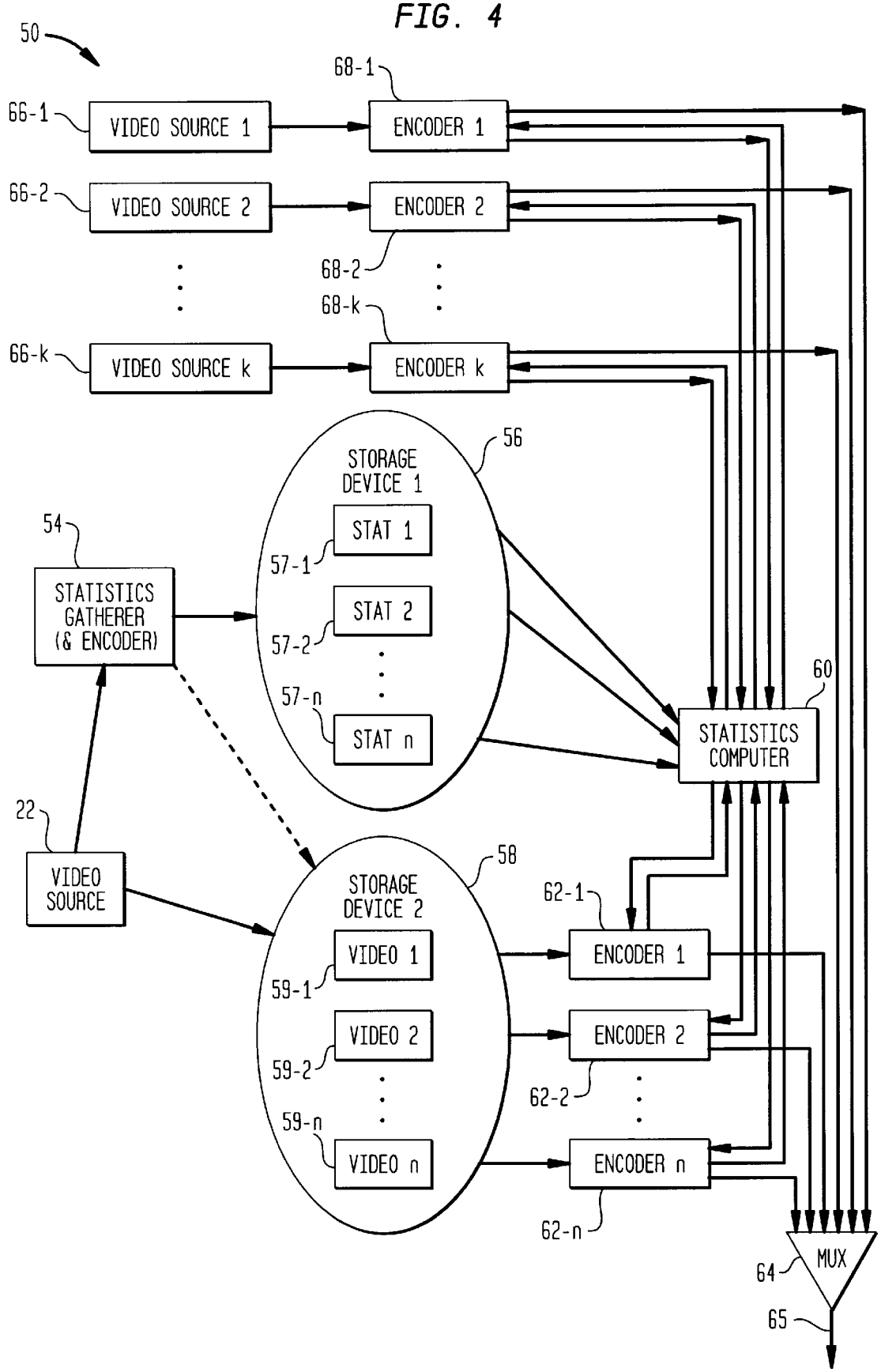

FIG. 4 shows another exemplary statistical multiplexer 50 utilizing pre-stored a priori statistics in accordance with the present invention. The statistical multiplexer 50 includes a video source 52, statistics gatherer (and optional encoder) 54, first storage device 56 storing n sets of pre-stored a priori statistics 57-i, second storage device 58 storing n video signals 59-i, a statistics computer 60 and encoders 62-i, all of which are used to provide substantially the same functions as the corresponding elements of the FIG. 3 statistical multiplexer 20. The statistical multiplexer 50 also includes k additional video sources 66-j, j=1, 2, ... k. The output of each of the k additional video sources is applied to a corresponding video encoder 68-j. The encoders 68-j supply conventional a posteriori statistics to the statistics computer 60. The statistics computer 60 processes the a posteriori statistics from the encoders 68-j in a conventional manner to thereby determine appropriate bit allocations for the k video signals from video sources 66j.

The statistics computer 60 uses both pre-stored a priori statistics and a posteriori statistics to determine appropriate bit allocations for the n video signals stored in the second storage device 58, as was previously described in conjunction with FIG. 3 above. The compressed bit streams outputted from the n encoders 62-i and the k encoders 68-j are applied to inputs of a multiplexer 64 which combines the n+k separate encoded bit streams into a single multiplexed bit stream outputted on channel output 65. The statistical multiplexer 50 of FIG. 4 allows certain previously-stored video signals to be encoded using both pre-stored a priori statistics and a posteriori statistics, while other video signals are encoded using conventional a posteriori statistics only. Such an embodiment is particularly useful in applications in which both stored and live video streams are multiplexed. For example, the statistical multiplexer 50 may be used in a broadcasting head-end which broadcasts previously-stored video signals such as pay-per-view movies as well as live video signals such as sporting or news events.

Figure 5:
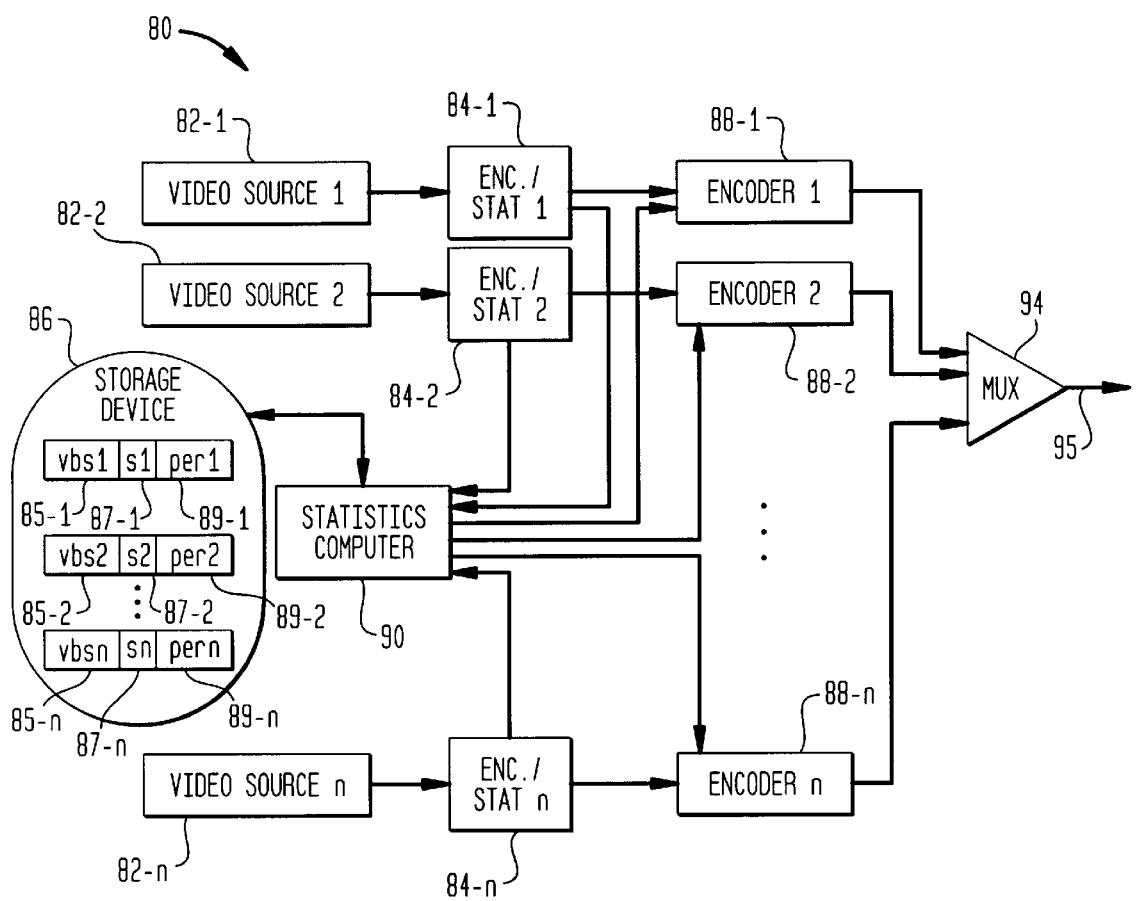
FIG. 5 shows a third exemplary embodiment of a statistical multiplexer utilizing preencoding a priori statistics in accordance with the present invention.

FIG. 5 shows another exemplary statistical multiplexer 80 utilizing only pre-stored apriori statistics in accordance with the present invention. The statistical multiplexer 80 includes n video sources 82-i, for i=1, 2, ..., n. Each video source outputs a video signal to a corresponding statistics gatherer/encoder 84-i, for i=1, 2, ..., n. The encoder portion of the elements 84-i encodes the video signals, but preferably stores the video signals as uncompressed bit streams 85-i, i=1, 2, ... n in the storage device 86. Illustratively, the storage device 86 may be connected to the statistics computer 90 as shown, connected to, and distributed amongst, each element 84-i or connected in a similar fashion as the storage devices 26,28 (FIG. 3) or 56,58 (FIG. 4). Additionally, certain pre-encoding results 89-i, for i=1, 2, ..., n, such as motion estimation results (optimal motion vectors, inter/intra decisions, coded/non-coded macroblock decisions), etc. are also stored with the video signal in the corresponding bit stream. Note that it is not necessary to store an entire video signal 85-i in such form in the storage device 86. Rather, it is possible to temporarily store only one or more pictures of a currently encoded video signal. Thus, this solution is amenable to even a real-time or live program event provided a one or more picture delay can be tolerated in the end-to-end feed (which is common place in ordinary live terrestrial broadcasts). The statistics gatherer portion of the elements 84-i generate corresponding pre-encoding a priori statistics for the n video signals being encoded. The n sets of pre-encoding a priori statistics 87-i are stored by the statistics gatherer portion of the elements 84-i in storage device 86.

The video bit streams 85-i are retrieved from storage device 86 and applied to inputs of corresponding encoders 88-i, while the sets of pre-encoding a priori statistics 87-i are retrieved from storage device 86 and applied to a statistics computer 90. The statistics computer 90 utilizes the n sets of pre-encoding a priori statistics 87-i to allocate available channel bits between the n bit streams to be multiplexed. The encoders 88-i each re-encode the retrieved video bit streams using the bit allocation determined by the statistics computer 90. Illustratively, if pre-encoding information 89-i is stored in the storage device 86, it is retrieved and used by the encoders 88-i in re-encoding the retrieved video bit streams 88-i. The re-compressed bit streams are applied to a multiplexer 94 which combines the re-compressed bit streams into a single channel output 95. The statistical multiplexer 80 of FIG. 5 generates improved bit allocation decisions by utilizing pre-encoding a priori statistics which are generated from a previous encoding of the video bit streams to be multiplexed.

Figure 6:
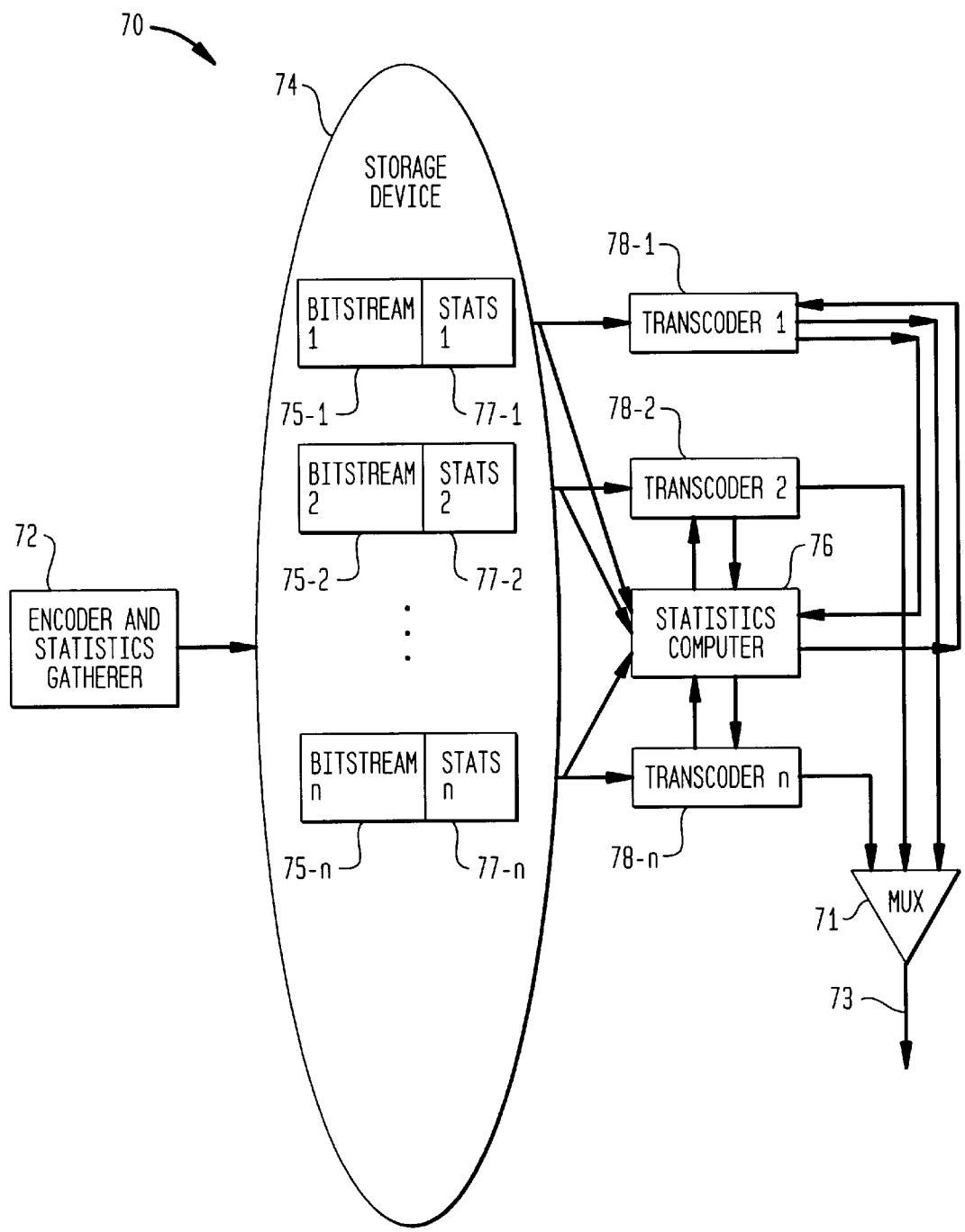
FIG. 6 shows a fourth exemplary embodiments of a statistical multiplexer utilizing a priori and a posteriori statistics in accordance with the present invention.

FIG. 6 shows another statistical multiplexer 70 according to the present invention which uses both a priori and a posteriori statistics in allocating available channel bits. A statistics gatherer and encoder element 72 receives n video signals. An encoder portion of the element 72 encodes each video signal to produce a compressed video bit stream 75-i, for i=1, 2, ..., n. A statistics gatherer portion of element 72 gathers a priori statistics 77-i, for i=1, 2, ..., n which may include pre-encoding statistics gathered during the encoding of the respective video signal, or other a priori statistics (e.g., inter-pixel differences). The compressed video bit streams 75-i and a priori statistics 77-i (and optionally, pre-encoding result information) are stored in a storage device 74.

Each compressed bit stream 75-i (and respective optional pre-encoding results) is retrieved from the storage device 74 by a corresponding transcoder 78-i, for i=1, 2, . . . , n. Likewise, a statistics computer 76 retrieves the a priori statistics 77-i corresponding to the retrieved compressed video bit streams 75-i. Each transcoder 78-i has a decoder portion which decodes the retrieved compressed video bit stream to reproduce the video signal. Each transcoder 78-i also has an encoder which re-encodes the reproduced video signal to produce a re-compressed video signal. The re-encoding of the reproduced video signal in each transcoder 78-i is controlled to achieve a bit rate as per a bit allocation received from the statistics computer 76. In re-encoding the reproduced video signals, the transcoders 78-i gather aposteriori statistics indicating the complexity involved in re-encoding the reproduced video signals. These a posteriori statistics are inputted to the statistics computer 76. The statistics computer 76 uses both the a priori and a posteriori statistics in allocating available channel bits to each transcoder 78-i. The re-compressed video bit streams are outputted to a multiplexer 71 which combines the re-compressed video bit streams into a single multiplexed bit stream which is outputted on channel output 73.

In the statistical multiplexer 20 of FIG. 3, the statistical multiplexer 50 of FIG. 4 and the statistical multiplexer 70 of FIG. 6, the pre-stored a priori statistical metric 27-i, 57-i or 77-i may be inter-pixel differences within a single picture or between multiple pictures. In the statistical multiplexer 20 of FIG. 3, the statistical multiplexer 50 of FIG. 4, the statistical multiplexer 70 of FIG. 6 or the statistical multiplexer 80 of FIG. 5, the pre-stored a priori statistics 27-i, 57-i, 77-i or 87-i may be pre-encoding gathered statistical metrics such as the number of bits in each picture, repeat field pattern, average quantization level, scene change locations and picture types used. The pre-encoding statistics tend to provide more accurate predictors of the complexity in encoding a video signal. In the statistical multiplexers 20, 50 and 70, the a posteriori statistical information gathered by the encoders 32-i, 62-i or 78-i can be similar to the pre-encoding information, i.e., the number of bits per picture, repeat field pattern, average quantization level, scene change location and picture type information can be used.

In the statistical multiplexers 20, 50, 70 or 80, the pre-encoding (if performed in the statistical multiplexers 20, 50 or 70) in the encoders 24, 54, 72 or 84 may be performed in one of a number of manners. In the first embodiment, pre-encoding is performed so as to achieve a constant bit rate. For example, the channel bit rate is divided by the number n of programs to be pre-transmitted over that channel. Each program is pre-encoded with an equal bit rate allocation. In a second embodiment, the pre-encoding is performed at a constant quantization level. In a third embodiment, the pre-encoding is performed using a constant "base quantization level" that is adjusted upward or downward for each macroblock based on the visual sensitivity of that macroblock to quantization noise.

In the statistical multiplexer 80 where only pre-encoding a priori statistics are used, the actual setting of final transmission bit rates may be performed as follows:

(1) The complexity of a given picture is determined form the a priori statistic stored for that picture. In the statistical multiplexer 80, after the picture has been pre-encoded, the complexity is determined as the product of the number of bits generated for that picture during pre-encoding, a measure of the quality distortion caused by quantization noise incurred during pre-encoding, and a constant which depends on the picture coding type.

Preferably, the constant is 1.0 for I (intra) and P (forward only predictive) pictures and in the range of 0.7 to 0.9 for B (bidirectionally predictive) pictures.

(2) The statistics computer 90 determines an estimate of the sum of the complexities of the next $K_0$ pictures to-be-pre-encoded. Illustratively, $K_0$ is a predetermined integer constant that is greater than or equal to 1. Depending on the implementation, the complexities may have been already determined for some or all of the $K_0$ pictures. For instance, if the program is a stored, completely pre-encoded event, then the estimate is an accurate sum. If the program is a live event or a real-time encoded event, then it is possible that less than $K_0$ complexities are pre-stored and available. For those complexities not available, an estimate is formed using the most recent complexity generated for a picture of the same type.

For example, suppose the program is a live event, $K_0$=15, the picture 0 is to be re-encoded, but statistics for only 5 pictures (numbered 0,1,2,3 and 4) are pre-encoded and stored. Suppose the picture 0 is an I picture and the group of picture sequence is $I_0\ B_1\ B_2\ P_3\ B_4\ B_5\ P_6\ B_7\ B_8\ \ldots$, where the subscript indicates the number (i.e., in encode order) of the picture. Furthermore, suppose that the following complexities are available for pre-encoded pictures $I_0$, $B_1$, $B_2$, $P_3$, $B_4$: complexity for $I_0$=100, complexity for $B_1$=8, complexity for $B_2$=12, complexity for $P_3$=25 and complexity for $B_4$=10. Then the following complexities are used to generate the sum:

| Picture | Complexity |
| --- | --- |
| $I_0$ | 100 |
| $B_1$ | 8 |
| $B_2$ | 12 |
| $P_3$ | 25 |
| $B_4$ | 10 |
| $B_5$ | 10 (estimate) |
| $P_6$ | 25 (estimate) |
| $B_7$ | 10 (estimate) |
| $B_8$ | 10 (estimate) |
| $P_9$ | 25 (estimate) |
| $B_{10}$ | 10 (estimate) |
| $B_{11}$ | 10 (estimate) |
| $P_{12}$ | 25 (estimate) |
| $B_{13}$ | 10 (estimate) |
| $B_{14}$ | 10 (estimate) |
| Sum | 400 |

Thus, the statistics computer 90 estimates the sum complexity as 400 for this program (at this moment).

(3) The statistics computer 90 sets the bit rate for the program in proportion to the estimate sum produced for that program relative to the sum produced for all to-be-multiplexed programs.

This process is repeated periodically. The process may be repeated as frequently as once every picture period of each program, less frequently, such as once every $K_0$ picture periods for each program, some frequency in between these two, etc.

In one embodiment, the average quantization parameter used to encode the picture may be used as the measure of the quality of distortion caused by the quantization noise in producing the complexity product. In a second embodiment, the average quantization parameter is increased if the image is smooth (so that the quantization noise is easily visible) and decreased if the image has a large amount of texture (so that the quantization noise is masked and not easily visible).

The third step may be further modified to ensure that each program is not allocated an excessively large or small amount of bits. For example, the statistics computer 90 may ensure that the bit rate determined for each program lies between threshold maximum and minimum bit rates. Alternatively, the second step can be modified to ensure that the complexity sum lies between threshold minimum and maximum complexity sums or that any individual complexity product lies between maximum and minimum complexity product thresholds for the corresponding picture type. (In this latter case, the complexity product thresholds for I pictures will be higher than the complexity product thresholds for B pictures.)

When repeat field detection is used, each encoded picture will contain a variable number of video fields in which it is displayed. For instance, a frame picture without a repeated first field will be displayed for two field periods, whereas a frame picture with a repeated first field will be displayed for three field periods. Repeated fields tend to reduce the number of bits in the compressed bit stream since no data is transmitted for the field that is repeated. Thus, when more repeated fields are present, the rate at which pictures are transmitted decreases as well as the bit rate. Such a situation may be accounted for in the rate allocation scheme by allocating bits to a program in proportion to the product of the sum complexity and the ratio of the number of pre-encoded pictures to the number of displayed fields in the pre-encoded pictures.

The following technique may be used for allocating bit rates amongst the to-be-multiplexed programs in the statistical multiplexers 20, 50 and 70 using both a priori and a posteriori statistics. A base bit rate is assigned to each encoder 32-i, 62-i and 78-i using any well-known "feed back" or a posteriori statistical multiplexing process, such as the process described in the Perkins & Arnstein reference. This base rate is denoted $R_i$ for the $i^{th}$ to-be-encoded program.

One or more pre-stored a priori statistics is measured for each program prior to the final encoding which a priori statistics can be gathered during a pre-encoding step or without pre-encoding the program. In the case that pre-encoding is performed, the statistic can be the above-noted complexity sum. In the case that pre-encoding is not performed, the statistic can also be a measure of spatial complexity such as the sum of local intra-picture variances or sum of adjacent pixel absolute differences. The statistic can also be a measure of inter-picture complexity such as the sum of the absolute differences formed by subtracting a pixel in one picture from a corresponding pixel in the following picture. A combination of such statistics may also be used. Note that the pre-encoding statistics tend to produce more accurate results. However, the statistics generated without pre-encoding provide a savings in hardware and/or time.

Let SFuturei be the sum of the a priori statistics for the next $K_1$ pictures for the program i, where $K_1$ is a predetermined constant. Let $SPast_i$ be the sum of the a posteriori statistics for the previous (already encoded) $K_1$ pictures. The bit rate for program i may be set in proportion to:

$$R_i \cdot f(SFuture_i, SPast_i)$$

where $f(SFuture_i, SPast_i)$ is a function that equals one if SFuturei =SPasti, that is greater than one if $SFuture_i > SPast_i$, and that is less than one if $SFuture_i < SPast_i$. For example, the following may used for function $f(SFuture_i, SPast_i)$:

$$f(SFuture_i, SPast_i) = \frac{K_2 + SFuture_i}{K_2 + SPast_i}$$

where $K_2$ is a predetermined constant. A large value of $K_2$ makes function $f(SFuture_i, SPast_i)$ less sensitive to a priori statistics whereas a small value of K makes the function $f(SFuture_i, SPast_i)$ more sensitive to a priori statistics.

When the statistical multiplexer 50 of FIG. 4 is used, the statistics computer 60 uses only a posteriori information for the encoders 68-i and both a priori and a posteriori information for the encoders 62-i. In this statistical multiplexer 50, the function $f(SFuture_i, SPast_i)$ may be defined in the same way for those encoders 62-i for which both a priori and a posteriori information is used in determining the bit allocation. For the encoders 68-i for which only a posteriori information is used to determine the bit allocation, the function $f(SFuture_1, SPast_1)$ may be set to 1.

It should be understood that the foregoing description is merely illustrative of the invention. Numerous alternative embodiments within the scope of the appended claims will be apparent to those of ordinary skill in the art. For example, although the multiplexers 34, 64, 71 and 94 are illustrated as combining n encoded video bit streams into a single channel, alternative multiplexers could be used to combine subsets of the n encoded bit streams into several different channels.

The claimed invention is:

1. A method for multiplexing at least two bit streams, each comprising encoded video signals, into a single multiplexed bit stream, comprising the steps of:
    (a) pre-encoding a plural of to-be-encoded pictures of each of said video signals, in each of said at least two bit streams, having mutually independent timing, wherein said pre-encoding includes motion compensation between I, P and B pictures of said to-be-encoded pictures,
    (b) during said step (a), generating pre-encoding a priori statistics indicative of a complexity involved in pre-encoding each of said video signals,
    (c) statistically allocating a bit rate to each of said video signals, in each corresponding bit stream, based on said pre-encoding a priori statistics generated in said step (b),
    (d) independently re-encoding each of said video signals, in each corresponding bit stream, to produce a corresponding compressed video bit stream depending on said bit rate allocated in said step (c), and
    (e) combining each of said compressed video bit streams into a single multiplexed bit stream.

2. The method of claim 1 further comprising the steps of:
    (f) during said step of pre-encoding, generating a pre-encoded compressed video bit stream for each of said video signals, and
    (g) prior to said step (d), decoding each of said pre-compressed video bit stream to reproduce said video signal and performing said step (d) on said video signals reproduced in said step (g).

3. The method of claim 1 further comprising the step of:
    (f) performing said step (d) on said same video signals on which said step (a) is performed.

4. The method of claim 1 further comprising the steps of:
    (f) during said step (a), generating pre-encoding results utilized in generating a pre-compressed video signal for each of said video signals, and (g) during said step (d), utilizing said pre-encoding results generated during said step (a) in compressing said video signals.

5. The method of claim 1 further comprising the steps of:
(f) generating said pre-encoding a priori statistics for a plurality of pictures of each of said video signals,
(g) for each video signal, adding up said pre-encoding a priori statistics for a plurality of said pictures of said video signal to produce a first sum,
(h) for each video signal, allocating a number of bits for encoding one of said pictures of said plurality in proportion to said first sum relative to sums produced for each video signal to be combined in said step (e).

6. The method of claim 5 further comprising the steps of, for each video signal:
(i) generating pre-encoding a priori statistics for a first sequence of pictures of a first predetermined length from a first one of said plurality of pictures to be encoded,
(j) adding up said pre-encoding a priori statistics for a second sequence of pictures of a second predetermined length from said first picture, and
(k) if said second predetermined length exceeds said first predetermined length, for each picture in said second sequence but not in said first sequence, estimating said pre-encoding a priori statistics.

7. The method of claim 1 wherein said bit rate allocated to at least one of said video signals depends on statistics gathered for at least two pictures of said at least one video signal.

8. The method of claim 1 wherein said pre-encoding a priori statistics measure a number of bits generated in encoding each of said video signals in said step (b).

9. The method of claim 1 wherein said pre-encoding a priori statistics measure an average quantization level used in encoding said video signals in said step (a).

10. The method of claim 1 wherein said pre-encoding a priori statistics include scene change locations identified in encoding said video signals in said step (a).

11. The method of claim 1 wherein said pre-encoding a priori statistics include repeat field patterns produced while encoding said video signals in said step (a).

12. A statistical multiplexer for multiplexing at least two bit streams, each comprising encoded video signals into a single multiplexed bit stream, comprising:
a source of said at least two bit streams, each having plural video signals,
a statistics gatherer receiving said video signals from said video source, for pre-encoding a plural of to-be-encoded pictures of each of said video signals, in each of said bit streams, having mutually independent timing, and for generating pre-encoding a priori statistics indicative of a complexity involved in pre-encoding each of said video signals, wherein said pre-encoding includes motion compensation between I, P and B pictures of said to-be-encoded pictures,
a statistics computer connected to statistics gatherer for statistically allocating a bit rate to each of said video signals, in each corresponding bit stream, based on said pre-encoding a priori statistics generated in said statistics gatherer,
one or more encoders connected to said statistics computer for independently re-encoding each of said video signals, in each corresponding bit stream, to produce a corresponding compressed video bit stream depending on said bit rate allocated in said statistics computer, and
a multiplexer for combining each of said compressed video bit streams with at least one other compressed video bit stream into a single multiplexed bit stream.

13. The statistical multiplexer of claim 12 wherein said statistics gatherer generates a pre-encoded compressed video bit stream for each of said video signals, said statistical multiplexer further comprising:
one or more decoders, each of which corresponding to a different one of said encoders, for decoding each of said pre-compressed video bit streams to reproduce said video signal, said corresponding encoder re-encoding said video signals reproduced by said corresponding decoder.

14. The method of claim 13 wherein said pre-encoding a priori statistics include picture types generated in encoding said video signals in said step (a).

15. The statistical multiplexer of claim 12 wherein said encoders re-encode said same video signals received at said statistics gatherer.

16. The statistical multiplexer of claim 12 wherein said statistics gatherer generates pre-encoding results utilized in generating a pre-compressed video signal for each of said video signals, and wherein said encoders utilize said pre-encoding results generated by said statistics gatherer in compressing said video signals.

17. The statistical multiplexer of claim 12 wherein said statistics computer generates said pre-encoding a priori statistics for a plurality of pictures of each of said video signals, for each video signal, adds up said pre-encoding a priori statistics for a plurality of said pictures of said video signal to produce a first sum, and for each video signal, allocates a number of bits for encoding one of said pictures of said plurality in proportion to said first sum relative to sums produced for each video signal to be combined by said multiplexer.

18. The statistical multiplexer of claim 17 wherein, for each video signal, said statistical multiplexer generates pre-encoding a priori statistics for a first sequence of pictures of a first predetermined length from a first one of said plurality of pictures to be encoded, adds up said pre-encoding a priori statistics for a second sequence of pictures of a second predetermined length from said first picture, and if said second predetermined length exceeds said first predetermined length, for each picture in said second sequence but not in said first sequence, said statistical multiplexer estimates said pre-encoding a priori statistics.

19. The statistical multiplexer of claim 12 wherein said bit rate allocated to at least one of said video signals by said statistics computer depends on statistics gathered for at least two pictures of said at least one video signal.

20. The statistical multiplexer of claim 12 wherein said pre-encoding a priori statistics measure a number of bits generated in encoding each of said video signals in said statistics gatherer.

21. The statistical multiplexer of claim 12 wherein said pre-encoding a priori statistics measure an average quantization level used in encoding said video signals in said statistics gatherer.

22. The statistical multiplexer of claim 12 wherein said pre-encoding a priori statistics include scene change locations identified in encoding said video signals in said statistics gatherer.

23. The statistical multiplexer of claim 12 wherein said pre-encoding a priori statistics include repeat field patterns produced while encoding said video signals in said statistics gatherer.

24. The statistical multiplexer of claim 12 wherein said pre-encoding apriori statistics include picture types generated in encoding said video signals in said statistics gatherer.

25. A method for multiplexing plural encoded video signals into a single multiplexed bit stream comprising the steps of:

(a) generating a priori statistics, during a pre-encoding stage, regarding
a plural of to-be-encoded pictures of each of plural video signals having mutually independent timing, said a priori statistics indicating a complexity involved in encoding said to-be-encoded pictures, wherein said pre-encoding stage includes motion compensation between I, P and B pictures of said to-be-encoded pictures, (b) generating aposteriori statistics regarding one or more previously encoded pictures of each of said video signals, indicating a complexity involved in encoding each of said previously encoded pictures, (c) statistically allocating a bit rate to each of said video signals based on said a priori and a posteriori statistics generated in said steps (a) and (b), (d) independently encoding each of said to-be-encoded pictures of said video signals to produce a corresponding compressed video bit stream depending on said bit rate allocated in said step (c), and (e) combining each of said compressed video bit streams into a multiplexed bit stream.

26. The method of claim 25 further comprising:

(f) pre-encoding each of said to-be-encoded pictures, and (g) gathering said a priori statistics during said step (f).

27. The method of claim 26 wherein said a priori statistics measure a number of bits generated in a compressed one of said to-be-encoded pictures in said step (f).

28. The method of claim 26 wherein said a priori statistics measure an average quantization level used in said step (f).

29. The method of claim 26 wherein said a priori statistics include scene change locations identified in said step (f).

30. The method of claim 26 wherein said a priori statistics include repeat field patterns produced in said step (f).

31. The method of claim 26 wherein said a priori statistics include picture types generated in said step (f).

32. The method of claim 25 wherein said a priori statistics include inter-pixel differences in said to-be-encoded pictures.

33. The method of claim 25 further comprising:

(f) allocating bits to a second group of one or more video signals using only a posteriori statistics gathered for said second group of video signals, (g) encoding said second group of video signals according to said bit allocations made in step (f) to produce a second group of compressed video bit streams, and (h) combining said second group of video compressed video bit streams and said video bit streams produced in said step (d) into a multiplexed bit stream.

34. A statistical multiplexer for multiplexing plural encoded video signals into a single multiplexed bit stream comprising:

a statistics gatherer for gathering a priori statistics, during a pre-encoding stage, regarding a plural of to-be-encoded pictures of each of plural video signals having mutually independent timing, said a priori statistics indicating a complexity involved in encoding said to-be-encoded pictures, wherein said pre-encoding stage includes motion compensation between I, P and B pictures of said to-be-encoded pictures, a plurality of encoders for encoding to-be-encoded pictures of said plural video signals and for generating a posteriori statistics regarding one or more previously encoded pictures of each of said video signals, indicating a complexity involved in encoding each of said previously encoded pictures, a statistics computer for statistically allocating a bit rate to each of said video signals based on said a priori and a posteriori statistics generated by said statistics gatherer and said plurality of encoders, wherein said encoders independently encode each of said to-be-encoded pictures of said video signals to produce a corresponding compressed video bit stream depending on said bit rate allocated by said statistics computer, and a multiplexer for combining each of said compressed video bit streams into a multiplexed bit stream.

35. The statistical multiplexer of claim 34 wherein said statistics gatherer comprises:

a second encoder for pre-encoding each of said to-be-encoded pictures to produce pre-compressed pictures, said statistics gatherer gathering said a priori statistics from said pre-compressed pictures.

36. The statistical multiplexer of claim 35 wherein said a priori statistics measure a number of bits generated in a compressed one of said to-be-encoded pictures in said second encoder.

37. The statistical multiplexer of claim 35 wherein said a priori statistics measure an average quantization level used in encoding said to-be-encoded pictures in said second encoder.

38. The statistical multiplexer of claim 35 wherein said a priori statistics include scene change locations identified in encoding said to-be-encoded pictures in said second encoder.

39. The statistical multiplexer of claim 35 wherein said a priori statistics include repeat field patterns produced in encoding said to-be-encoded pictures in said second encoder.

40. The statistical multiplexer of claim 35 wherein said a priori statistics include picture types generated in encoding said to-be-encoded pictures in said second encoder.

41. The statistical multiplexer of claim 34 wherein said a priori statistics include inter-pixel differences in said to-be-encoded pictures.

42. The statistical multiplexer of claim 34 wherein said statistics computer allocates bits to a second group of one or more video signals using only a posteriori statistics gathered for said second group of video signals, said statistical multiplexer further comprising:

a second group of encoders for encoding said second group of video signals according to said bit allocations therefor to produce a second group of compressed video bit streams, wherein said multiplexer combines said second group of video compressed video bit streams and said video bit streams produced by said encoders into a multiplexed bit stream.

* * * * *